2,907,689

METHOD OF CONTROLLING CORROSION IN A NEUTRONIC REACTOR

Calvin P. Kidder, Wilmington, Del., and Clifford K. Sloan, Thornton, Pa., assignors to the United States of America as represented by the United States Atomic Energy Commission No Drawing. Application October 24, 1949
Serial No. 123,308

5 Claims. (Cl. 148—6.2)

This invention relates to a method for treating water so as to minimize the quantity of solids deposited therefrom and inhibit corrosion of metal surfaces with which the treated process water is in contact.

This invention also relates to a method for removing from metal surfaces, and particularly aluminum metal surfaces, deposits formed upon said metal surfaces by water flowing in contact therewith.

This invention also relates to the control of corrosion, the deposition of films and the removal of films deposited from water circulating, for the most part, in an open system. This invention is particularly applicable for use in circulating water systems operated in conjunction with, and as a coolant for neutronic reactors.

In the operation of neutronic reactors, the use of water as a coolant requires control of corrosion and the reduction to a minimum of any film formation upon the reactor tubes and the jacketing materials enclosing fissionable materials, which jacketing materials are selected to prevent penetration of either water or moisture therein.

Waters obtained from the usual natural sources of supply such as rivers, wells, etc. at their normal pH are corrosive to aluminum, which is the metal commonly used as a protective covering for the components used throughout the neutronic reactor. Furthermore, the iron content of these natural waters has been observed to be sufficient to settle from the water and deposit, usually in the form of a gelatinous or solid scale of hydrous oxide, on the slugs and tubing with which the coolant water comes in contact. Such scale deposits or films derived from the water which contains, in addition to iron, the usual dissolved solids and/or colloidal materials, are extremely undesirable since they cause a reduction in the heat transfer coefficient which in turn causes increased temperatures in the metals within the pile, thereby limiting the power output of the pile. The deposition of film upon units in any heat transfer relation, as well as in the heat transfer relation in a neutronic reactor, is extremely undesirable from the standpoint of economy.

It is therefore an object of this invention to provide a method to reduce corrosion and to inhibit film deposition on metal surfaces which are in contact with water circulating in open systems.

A further object is to provide a method for minimizing the amount of film deposited from water circulating in contact with aluminum metal surfaces.

A still further object is to provide a means for the removal of any films deposited on metal surfaces in contact with circulating water.

A still further object is to provide a method for the attainment of any of the above-mentioned objects of this invention, either singly or in combination.

Other objects will be apparent to those skilled in the art upon further examination of this specification.

In accordance with one embodiment of this invention, we have discovered that by adding an alkali metal dichromate in an amount sufficient to effect a concentration of dichromate between 1.8 and 2.2 p.p.m. and, if necessary, thereafter adjusting the pH to between 7.3 and 7.8, that in process water containing iron preferably not in excess of 1.0 p.p.m., the resultant treated water is less corrosive to metal surfaces, particularly aluminum metal surfaces, coming in contact with such water and the deposition of solid scale deposits or film from said water upon said metal surfaces is substantially minimized.

Corrosion of metal is further minimized and the deposition of solids from process water is substantially decreased by adding to process water a soluble dichromate of an alkali metal in an amount sufficient to bring the dichromate concentration therein to a value between 1.8 and 2.2 p.p.m. and adding a soluble alkali metal silicate, such as sodium silicate, to said process water and adjusting the pH of the treated water to a value between 7.3 and 7.8. The soluble alkali metal silicate is added suitably in an amount equivalent to one-hundred times the original iron content of the process water but preferably not in excess of 30 p.p.m. calculated as silicon dioxide.

Any film deposited from the treated process water described in the immediately preceding embodiment of this invention can be removed by the process of the instant embodiment of this invention which comprises adding a water-insoluble siliceous material, such as diatomaceous earth to the treated process water. Other siliceous materials, such as hydrous silicic acid and natural or synthetic hydrous silicates of magnesium or aluminum can also be suspended in process water in suitable amounts such as between 2 and 300 p.p.m. or preferably between 50 and 100 p.p.m. Siliceous materials having a particle size sufficient to pass a screen of 100 mesh size are recommended. Materials which are too finely ground would tend to augment rather than hinder film deposition, while larger particles would settle out and clog the cooling system. The preferred particle size for siliceous materials employed herein varies from 5 to 15 microns.

In accordance with the instant embodiment concerning removal from metal surfaces of solids deposited from water flowing in contact therewith, the water-insoluble siliceous material is added to the process water in an amount sufficient to effect therein a suspension containing between 50 and 100 p.p.m. of said siliceous material. Coagulation and deposition of iron from treated process water containing suspended insoluble siliceous materials, in addition to iron, is inhibited by addition thereto of a metal dichromate. The dichromate is added in an amount sufficient to effect a dichromate concentration between 1.2 and 2.2 p.p.m., and the pH of the resultant solution is adjusted to a value between 7.3 and 7.8. Coolant water treated in accordance with the process of the present invention scours the metal surface with which it comes in contact. The scouring action exerted by the treated process water neither corrodes nor erodes metal surfaces, even aluminum surfaces.

In each embodiment of this invention the pH is adjusted as necessary either by the addition of sulphuric acid to effect a reduction in pH, or in the addition of lime to increase the pH. In the above embodiments of this invention the pH range is a critical limitation, particularly in treatment of process water intended for use in a neutronic reactor, since it has been found that in the presence of radiation, the dichromate tends to become reduced to the chromic state which deposits as film on the metal surfaces with which the water comes in contact unless the pH is adjusted to a value between 7.3 and 7.8, preferably to about pH 7.5. Under these pH conditions, the extent of reduction of dichromate to chromate in the presence of pile radiation as well as the extent of iron pickup from the supply lines is reduced to a negligible value. This pH level is also necessary because iron is more readily deposited as film at a pH lower than 7. At a pH in excess of 8, lime tends to precipitate as calcium carbonate film.

The total chloride content including the free chlorine is preferably limited to 2 p.p.m. because in excess of this amount, corrosion of the aluminum is increased and this chloride level is known to be sufficient for the control of algae.

Process water treated in accordance with this invention to provide between 1.8 and 2.2 p.p.m. soluble dichromate and a pH between 7.3 and 7.8 effectively inhibits corrosion, erosion and abrasion of metal surfaces with which this treated process water comes in contact. Aluminum metal surfaces, which are sensitive even to abrasion caused by the natural turbidity in water, are not adversely affected by this treated water. A concentration of dichromate between 1.8 and 2.2 p.p.m. is apparently sufficient to provide an outer protective film over the oxide film on aluminum and at a pH between 7.3 and 7.8, the amount of dichromate which is reduced to trivalent chromium and deposited on aluminum surfaces is negligible.

The films deposited from process water containing colloidal or dissolved solids consist chiefly of the hydrous oxides of iron and/or aluminum and trivalent chromium. The oxides of iron and chromium are the more common film constituents since they are readily picked up by the water either prior to or during the use of such process water as a coolant. However, iron is the more troublesome of the two elements with respect to formation of film. If the iron content of process water is in excess of 0.03 p.p.m., a water-soluble alkali silicate such as sodium silicate is added to the water which silicate inhibits the deposition of iron films therefrom when used in conjunction with the soluble dichromate present in concentrations between 1.8 and 2.2 p.p.m. at a pH between 7.3 and 7.8. The principal effect of the alkali silicate in such a system is to inhibit coagulation of iron which tends to deposit as a film, while the continued presence of dichromate serves as a protective agent for metal surfaces against any abrasion caused by the presence of siliceous materials or excess turbidity. The co-operation between the silicate and dichromate in this instance suggests the possibility of synergetic cooperation between the two components. Even in the presence of both dichromate and the soluble silicate it is anticipated that some film, especially iron films, will be deposited if either the iron concentration of the process water should increase, that is, to an iron content over 0.3 p.p.m., or the heat flux becomes sufficient to accelerate deposition of iron. If deposited, such films can be removed by the scouring action of a suspension of siliceous material present in amounts between 2 and 300 p.p.m. and preferably between 50 and 100 p.p.m. The expedient use of a water-insoluble siliceous material, such as diatomaceous earth, is advisable whenever the iron content of the process water exceeds 0.3 p.p.m. since iron present in excess of this level would require at least 30 p.p.m. of soluble silicate to inhibit film deposition and 30 p.p.m. is the preferred maximum limit for this soluble silicate concentration used in effectively inhibiting scale or film deposition.

In accordance with another embodiment of this invention, we have further discovered that any films deposited on metal surfaces in contact with the process water are effectively removed by the addition to the process water of a suspension of a water-insoluble siliceous material, and preferably between 1.8 and 2.2 p.p.m. alkali metal dichromate, and adjusting the pH in the alkaline range. However, in the embodiment of this invention the dichromate may be varied widely, and may be present in any amount within the limits of solubility.

The suspended siliceous material added to the process water scours the metal surface on which any film is deposited. As in the other embodiments, the presence of dichromate is also necessary in a system containing insoluble siliceous material in order to protect the metal surfaces from erosion and abrasion, as previously pointed out in connection with the use of soluble silicate to inhibit deposition of film.

Obviously the rate and extent of film deposition from the water systems described herein are also affected by such factors as temperature, heat flux, and flow rate. We have observed that at low velocities the rate of deposition of iron film is faster and the films are thicker than those deposited at higher velocities. The coarse film formed at low flow rate does not decrease heat transfer as much as film of corresponding thickness formed under higher velocities. At constant velocity the deposition of iron film varies directly with the heat flow. Each embodiment of this invention is operable up to about 100° C. but is preferably carried out under a maximum temperature of 65° C. The preferred maximum for heat flux is about 20 kw. per foot since we have found that at a higher power level, i.e. in the vicinity of 35 kw. per foot, the rate of increase in pressure drop is approximately three times greater than that obtained at 20 kw. per foot. At these power levels the water temperature rose respectively 26 and 39° C.

The rate of mixing or turbulence is established by the geometry of the tubes within the pile and is varied only by changing the velocity of flow.

The criterion selected as a sufficiently accurate indicator for the extent of film deposition within the system is that of the observed pressure drop across the annulus through which the water is introduced. The formation or deposition of film effects a decrease in the annular area which in turn causes a substantial increase in the resistance to flow of water. The latter can be measured in terms of pressure drop across the annulus.

In the particular neutronic reactor selected as an example, the inlet pressure on aluminum tubes is limited to a maximum of 200 pounds per square inch, while the header pressures should not exceed 385 pounds per square inch. At a constant flow rate, a nominal increase in pressure of 5 pounds per square inch is a significant indication of some film formation.

The following data are illustrative for the practical application of this invention.

Raw process water having the following composition:

| | Range in p.p.m. |
|---|---|
| Turbidity | 1–130 |
| Iron as Fe | 0.02–1.0 |
| Copper as Cu | 0–0.04 |
| Phenolphthalein alkalinity as $CaCO_3$ | 0–4 |
| Methyl orange alkalinity as $CaCO_3$ | 55–65 |
| Soap hardness as $CaCO_3$ | 60–75 |
| Aluminum as Al | 0–0.01 |
| Calcium as Ca | 16–22 |
| Magnesium as Mg | 3–7 |
| Sulfates as $SO_4$ | 8–14 |
| Chlorides as Cl | 0.1–0.5 |
| Dissolved Silica as $SiO_2$ | 3–7 |
| Manganese as Mn | 0–0.01 |
| Suspended solids | 1–130 | is treated with either alum or ferric sulphate and clarified to obtain a residual aluminum content not in excess of 0.01 p.p.m. and an iron content less than 0.03 p.p.m. The use of up to 40 p.p.m. of hydrated lime is permissible in order to obtain proper pH and flocculation of iron. The chloride content should not exceed 2 p.p.m. and activated carbon up to 2 p.p.m. is added, if necessary, to maintain the free chlorine well within the permissible maximum of 0.2 p.p.m.

The resultant process water should have the following composition:

| | Range in p.p.m. |
|---|---|
| Turbidity | 3–7 |
| Iron as Fe | 90–120 |
| Copper as Cu | 15–45 |
| Phenolphthalein alkalinity as $CaCO_3$ | 0–0.01 |
| Methyl orange Alkalinity as $CaCO_3$ | 0 |
| Soap hardness as $CaCO_3$ | 0.02–0.04 |
| Aluminum as Al | 0–0.04 |
| Calcium as Ca | 0–10 |
| Magnesium as Mg | 35–65 |
| Sulfates as $SO_4$ | 65–95 |
| Chlorides as Cl | 0–0.01 |
| Dissolved $SiO_2$ | 17–33 |
| Dissolved solids | 3–7 |
| Loss on ignition of dissolved solids | 15–40 |
| Manganese as Mn | 0.5–1.5 |
| pH, 7.5–8.2. | |

In treated (i.e. flocculated with ferric sulphate or alum and clarified) process water, wherein the residual aluminum content is below 0.01 p.p.m. and the iron content is not in excess of 0.03 p.p.m. the addition of sufficient sodium dichromate to effect a concentration in the process water between 1.8 and 2.2 p.p.m., and the addition of sufficient sulphuric acid to obtain a pH between 7.5 and 7.8 furnished adequate protection for aluminum metal surfaces and effectively eliminates any corrosion thereof and prevents film deposition thereon.

In treated process water containing between 0.01 p.p.m. and 0.3 p.p.m. iron, sufficient sodium dichromate is added to effect a dichromate concentration between 1.8 and 2.2 p.p.m. together with sodium silicate, calculated as $SiO_2$ in an amount which is one-hundred times the iron concentration or two-hundred times the aluminum concentration, whichever is the larger. The pH is adjusted to between 7.5 and 7.8 with sulphuric acid. Sodium silicate in this concentration effectively prevented the coagulation of iron or aluminum in the treated process water.

The range of temperature in the examples preceding is between 30 and 65° C.

Films deposited on the aluminum metal tubes were removed therefrom by flushing for a two-hour period at a pressure of 360 pounds per square inch using process water containing 2.0 p.p.m. sodium dichromate dissolved therein and 70 p.p.m. diatomaceous earth suspended in the process water having a pH of 7.5.

The preceding examples are merely illustrative of the principal elements of the various embodiments of this invention and many alterations and changes may be made therein without departing from the spirit and scope of this invention which is set forth in the appended claims which are intended to cover all features of novelty disclosed herein taken either singly or in combination.

What is claimed is:

1. A process for treating coolant water containing suspended solids together with up to 1 p.p.m. of iron to minimize corrosion of metal surfaces in contact with said water, wherein said water is circulated in an open system, and to minimize deposition of solids therefrom on said metal surfaces, comprising adding an alkali metal dichromate in an amount sufficient to bring the concentration of dichromate in said water solution to between 1.8 and 2.2 p.p.m. and adjusting the pH between 7.3 and 7.8.

2. A process for treating cooling water, containing iron and suspended solids and circulating in an open system, to minimize corrosion of metal surfaces in contact with said water and to minimize deposition to solids therefrom, comprising adding an alkali metal dichromate in an amount sufficient to bring the concentration of said dichromate in said water solution to between 1.2 and 2.2 p.p.m., adding a soluble alkali metal silicate in a concentration ranging from 100 times the original iron content of said water to a maximum of 30 p.p.m. on the basis of $SiO_2$ content and adjusting the pH in said solution to between 7.3 and 7.8.

3. A process to minimize corrosion of aluminum metal surfaces, wherein said corrosion is caused by contact of said aluminum metal surfaces with an open, circulating coolant water system containing iron in excess of 0.03 p.p.m., and to minimize deposition of solids from said water, comprising adding an alkali metal dichromate in an amount sufficient to bring the concentration of said dichromate in said water solution to between 1.8 and 2.2 p.p.m., adding an alkali metal silicate in a concentration ranging from 100 times the original iron content of said water to a maximum of 30 p.p.m. on the basis of $SiO_2$ content and adjusting the pH in said solution to between 7.3 and 7.8.

4. A process for removing from aluminum metal surfaces solids deposited from coolant water flowing in contact with said aluminum metal surfaces which comprises adding to a coolant water an alkali metal dichromate in an amount sufficient to bring the dichromate concentration in said coolant water to between 1.8 and 2.2 p.p.m., adjusting the pH between 7.3 and 7.8, and adding thereto sufficient siliceous material having a particle size between 5 and 15 microns so as to effect a suspension thereof between 2 and 300 p.p.m.

5. The process of claim 4 wherein said siliceous material is diatomaceous earth added in sufficient amount to effect a suspension between 50 and 100 p.p.m. in said coolant water.

References Cited in the file of this patent

UNITED STATES PATENTS

| 1,946,152 | Edwards | Feb. 6, 1934 |
| 1,946,153 | Edwards | Feb. 6, 1934 |

FOREIGN PATENTS

| 393,996 | Great Britain | June 19, 1933 |
| 453,226 | Great Britain | Sept. 1, 1936 |

UNITED STATES PATENT OFFICE
CERTIFICATE OF CORRECTION

Patent No. 2,907,689                                    October 6, 1959

Calvin P. Kidder et al.

It is hereby certified that error appears in the above numbered patent requiring correction and that the said Letters Patent should read as corrected below.

Column 5, lines 3 to 19, the composition should appear as shown below instead of as in the patent:

|  | Range in p.p.m. |
|---|---|
| Turbidity | 0 — |
| Iron as Fe | 0.02 — 0.04 |
| Copper as Cu | 0 — 0.04 |
| Phenolphthalein Alkalinity as $CaCO_3$ | 0 — 10 |
| Methyl Orange Alkalinity as $CaCO_3$ | 35 — 65 |
| Soap Hardness as $CaCO_3$ | 65 — 95 |
| Aluminum as Al | 0 — 0.01 |
| Calcium as Ca | 17 — 33 |
| Magnesium as Mg | 3 — 7 |
| Sulfates as $SO_4$ | 15 — 40 |
| Chlorides as Cl | 0.5 — 1.5 |
| Dissolved $SiO_2$ | 3 — 7 |
| Dissolved Solids | 90 — 120 |
| Loss on Ignition of Dissolved Solids | 15 — 45 |
| Manganese as Mn | 0 — 0.01 |
| pH | 7.5 — 8.2 |

Signed and sealed this 4th day of December 1962.

(SEAL)
Attest:

ERNEST W. SWIDER

Attesting Officer

DAVID L. LADD
Commissioner of Patents